2,981,652

COMPOSITION COMPRISING ALKALINE SOLUTION OF PHENOL FORMALDEHYDE RESIN AND FORMAMIDE AND PROCESS OF BONDING SURFACES WITH SAME

Arlo A. Peterson and Edgar B. Baker, Seattle, Wash., assignors to The Borden Company, New York, N.Y., a corporation of New Jersey No Drawing. Filed Oct. 28, 1958, Ser. No. 769,998

8 Claims. (Cl. 154—140)

This invention relates to condensation products of a phenol with an aldehyde and to the reaction thereof with formamide. The invention is particularly useful in the bonding of plywood, laminated beams, paper-to-wood laminates, and various specialties.

The production of a water-proof bond in plywood or laminates of other cellulosic materials has required the use of either high temperatures of setting such as 270° F. and higher or a strong acid, acid catalyzed condensation products being sometimes used in solution in an organic solvent. The solvent is inflammable. Furthermore, the strong acid causes deterioration of the surface of the wood or other cellulosic material being bonded by the adhesive.

Our invention provides an adhesive composition that is free from the objectionable acid and does not require application in an organic solvent. In a representative test in which layers of wood were clamped together against our adhesive material composition, held at a temperature of 160° F., then aged and tested under strong shear, 98% of the failures occurred in the wood and only 2% in the adhesive joint. In other tests we have cured our adhesive satisfactorily at temperatures as low as 70° F.

Briefly stated, our invention comprises the product resulting from incorporating formamide into a phenol-aldehyde resin to make the resulting composition thermosetting even at low temperatures. It comprises also the process of bonding cellulosic and other surfaces with the resulting composition at room temperatures or moderately thereabove.

As to materials, the phenolic condensate or resin used is one that is further condensable and also soluble in solutions of alkali metal hydroxides.

The phenol used in making the condensate is ordinarily phenol $C_6H_5OH$. Other phenols that may be used are the cresols, xylenols, and resorcinol either alone or in admixture with the monohydroxybenzene $C_6H_5OH$.

As the aldehyde, we ordinarily use formaldehyde.

In making the condensation, we use proportions of the aldehyde to phenol that are conventional, as, for example 1–3 moles of the aldehyde to 1 mole of the selected phenol. We effect the condensation under alkaline conditions as with sodium hydroxide or potassium hydroxide as the catalyst of condensation. We continue the condensation to the stage at which a resinous condensation product is formed that is insoluble in water but soluble in alcohol and alkali metal hydroxide solution and not thermoplastic, but condensable further to thermoset condition.

Into the alkali soluble condensate so made or during the making of the condensate, we may introduce and disperse a small proportion of a thickener such as methyl cellulose or the like. Then we may and suitably do introduce also a filler as, for instance, nut shell flour, wood flour, Douglas fir bark filler, or like organic fibrous filler, particularly a lignocellulose filler.

Because of the reaction of the formamide in the setting of the adhesive and the evolution of ammonia during this reaction, it is desirable to introduce a small proportion of a material that reacts with ammonia and decreases the odor thereof. For this purpose we ordinarily introduce into our finished composition, before use, a small amount of formaldehyde.

In any case, we use a large amount of sodium hydroxide, potassium hydroxide, or like alkali metal alkali sufficient to dissolve the phenolic resin, usually the phenol-formaldehyde condensate. We consider that the setting of our composition is due in part at least to the reaction of the sodium hydroxide with the formamide according to the following equation:

$$HCO-NH_2 + NaOH \rightarrow HCOONa + NH_3$$

The reaction destroys in part the caustic alkali upon which the solubility depends.

There is reduction of pH as the setting proceeds and increase of viscosity of the product to the point of gelation.

The reaction is continued until the ammonia evolution is substantially complete and the adhesive is set. The time required for such release of ammonia and setting may be determined in preliminary tests with like materials. Usually 1–24 hours are sufficient. The product is insoluble in hydrocarbon liquids such as hexane or benzene. As to proportions, we use sufficient water to form a solution of the adhesive composition of desired solids content. Proportions of other materials that are permissible and those that are recommended for best commercial results are shown in the following table:

| Resin Component | Parts by Weight | |
| --- | --- | --- |
|  | Permissible | Commercial Recommendation |
| Phenol-aldehyde condensation product, calculated as phenol only | 100 | 100 |
| Alkali metal hydroxide | 15.45 | 23.35 |
| Resin solids content | 15–45 | 25–40 |
| Gum (e.g., methyl cellulose) | 0–5 | 0–3 |
| Mixed Adhesive Component: | | |
| Phenol-aldehyde condensation product, calculated as phenol only | 100 | 100 |
| Formamide | 5–50 | 10–35 |
| Filler | 0–50 | 0–30 |
| Formaldehyde in excess of condensation quantity (as 100% formaldehyde) | 0–10 | 2–10 |
| Water | 0–80 | 0–40 |

Proportions of the formaldehyde above the largest amount shown are unnecessary, and, therefore, uneconomical.

As to conditions of use, the adhesive composition described is applied and cured at low temperatures, examples being 70° F. or above up to about 165° F. or somewhat higher as to about 200° F. Room temperature is satisfactory for most purposes.

The entire adhesive composition may be applied to one or both of the surfaces to be bonded. In one modification, we apply the composition less the formamide and a part of the water to one of the surfaces, as of plywood veneers, and the formamide and the remainder of the water to the other surface to be adhered. In any event, we press together the two surfaces with the adhesive composition disposed therebetween and hold the surfaces together under pressure until the cure is effected at the temperature selected.

The adhesive compositions described are particularly satisfactory in gluing not only plywood but also laminated timber to paper, paper to paper, and paper to wood surfaces.

The invention will be further illustrated by description in connection with the following specific examples. In these examples and elsewhere herein proportions are expressed as parts by weight unless stated to the contrary.

Example 1.—Resin composition 1 mole of U.S.P. phenol (87% phenol and approximately 13% water) is mixed with 2 moles of formaldehyde in 37% solution and then with caustic soda in 50% aqueous solution and in increments, in total amount to provide 40 parts by weight of sodium hydroxide for 100 of the phenol on the dry basis. Additional water is added in the amount of 75 parts for 100 of the phenol, this water being added in increments during the progress of the condensation. During the addition of the sodium hydroxide, the temperature of the mass is allowed to rise to 90°–100° C. and at the end to approximately 100° C., under a reflux condenser. The reaction is allowed to continue with cooling of the mass until the viscosity on the Gardner scale becomes "U" at a temperature of about 80°–85° C. The composition is then cooled rapidly.

The product so made is the resin composition referred to in Example 2. It has a total solids content of approximately 40%. The pH is about 12.9.

Example 2.—Adhesive

The resin composition made as described in Example 1 was then compounded into an adhesive of the following composition:

Glue mix:                                                          Parts
  Resin composition of Example 1 (40% solution in water) _____ 100
  Formaldehyde solution, 37% _____ 5
  Additional water _____ 10
  Formamide _____ 7
  Fir wood flour "special" _____ 10

The glue mix made as described, when tested at various periods after mixing and in the concentration shown above, showed the following viscosities:

| Hours after mixing | centipoises |
|---|---|
| 0 | 589 |
| 1 | 785 |
| 2 | 997 |
| 3 | 1377 |
| 4 | 1725 |

Example 3.—Use of adhesives

The final glue product of Example 2 was used in laminating Douglas fir lumber under the following conditions:

Glue spread _____ 50 lbs. each face.
Closed assembly time _____ 60 minutes.
Clamped pressure _____ 150 p.s.i.
Clamp time _____ 16 hours.
Clamp temperature _____ 160° F.
Aged _____ 10 days at 73° F. before testing.

This laminated beam was tested by the dry compression, 3½ cycle and vacuum pressure methods. The dry compression and 3½ cycle test samples were cut as specified in MIL–W–2038 (Ships), and tested as specified in 4.5.3.

The vacuum pressure samples (cyclical exposure test samples) were cut and tested as specified in MIL–W–2038 B (Ships) 4.5.2.

The 3½ cycle test, with the same shear compression blocks as used in the dry compression test, is made by the procedure and method listed as CS–45–55. The cycles were as follows:

48 hour soak at 60°–70° F. water
8 hour dry at 145° F.
16 hour dry
8 hour dry
16 hour soak
8 hour dry
16 hour soak and break wet The test results were as follows:

Dry compression:
  1600 [1] p.s.i.—98% wood failure
3½ cycles:
  925 [2] p.s.i.—87% wood failure
Cyclical exposure—i.e. vacuum pressure:
  Percent delaminations—
    1st cycle—0.0%
    2nd cycle—0.4%
    3rd cycle—0.4%
    Total [3] delamination—0.4%

[1] Average of 7 test blocks.
[2] Average of 14 test blocks. These test blocks were cut from the cyclical exposure test specimens. They were subjected to excessive testing and the results, which are very good, are probably lower than what they normally would be.
[3] This is an average for 2 blocks tested. The permissible minimum is 5% at the end of 2 cycles or 8% at the end of 3 cycles.

Eight-ply beams were glued with the above glue mix using the following conditions:

Glue spread _____ 50 lbs. each face of joint.
Closed assembly time _____ 60 minutes
Clamping pressure _____ 150 p.s.i.
Clamping time _____ 16 hours.
Temperature _____ 160° F.
Aged _____ 10 days at 73° F. before testing.

The glue joints of the beam were tested according to MIL–W–2038 (Ships), 4.5.2 and 4.5.3.

Test results were:
(1) Block shear—1600 p.s.i.—98% wood failure.
(2) cyclical exposure—Percent delamination:
  1st cycle—0.0%
  2nd cycle—0.4%
  Total delamination—0.4%

Example 4.—Other phenols

The procedure and compositions of Examples 1–3 are used except that the phenol there used is replaced by an equivalent weight of any cresol or xylenol or by a mixture of 90 parts of any of the mononuclear monohydroxy phenols disclosed with 10 parts of resorcinol.

Example 5.—Inclusion of gum

The procedure and composition of any of the Examples 1–4 are used except that methyl cellulose is introduced in the proportion of 0.1–5 parts for 100 of the said condensation product, the introduction being made before the condensation is completed.

It is to be understood that it is intended to cover all changes and modifications of the examples of the invention herein chosen for the purpose of illustration which do not constitute departures from the spirit and scope of the invention.

We claim:

1. A low temperature setting resin composition comprising an aqueous solution of a phenol and formaldehyde condensation product that is insoluble in water, soluble in aqueous alkali metal hydroxide solution and further condensable, an alkali metal hydroxide in amount to dissolve the condensation product, and formamide as setting accelerator therefor, the proportions being approximately within the ranges 15–45 parts of the said hydroxide and 5–50 parts of the formamide for 100 parts of the phenol represented in the condensation product.

2. The composition of claim 1, the said phenol being of the formula $C_6H_5OH$.

3. The composition of claim 1, the said condensation product being the product of condensing 1 mole of phenol $C_6H_5OH$ with 1–3 moles of formaldehyde.

4. The composition of claim 1 in which the solids content of the resin composition is between 15% and 45%.

5. The composition of claim 1 including unreacted formaldehyde admixed in the said solution in the proportion of about 2–10 parts by weight for 100 parts of the phenol represented in the said condensation product.

6. The composition of claim 1, the alkali metal hydroxide used being sodium hydroxide.

7. In bonding two surfaces, the process which comprises applying therebetween all of the components of the resin composition of claim 1 and then pressing and holding together the two surfaces with the composition therebetween and at a temperature of at least about 70° F. until the resin composition sets.

8. In bonding two surfaces, the process which comprises applying to one of the surfaces an aqueous solution of an alkali metal hydroxide soluble phenol-formaldehyde condensation product and an alkali metal hydroxide in amount to dissolve the said product, applying to the other of the said surfaces a solution of formamide, and then pressing and holding together the two thus treated surfaces until the materials in the solutions react and set to produce an adhesive bond.

References Cited in the file of this patent

Ellis: "Chemistry of Synthetic Resins," volume 1, page 353, Reinhold Publishing Corp., New York, N.Y., 1935.